US009609152B2

(12) United States Patent
Suwabe

(10) Patent No.: US 9,609,152 B2
(45) Date of Patent: Mar. 28, 2017

(54) SYSTEM, USER INTERFACE DISPLAY CONTROL METHOD, SERVER, INFORMATION PROCESSING APPARATUS AND STORAGE MEDIUM

(75) Inventor: Takeshi Suwabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1072 days.

(21) Appl. No.: 12/861,276

(22) Filed: Aug. 23, 2010

(65) Prior Publication Data

US 2011/0072322 A1 Mar. 24, 2011

(30) Foreign Application Priority Data

Sep. 18, 2009 (JP) ................................ 2009-218003

(51) Int. Cl.
*H04N 1/00* (2006.01)
*H04N 1/32* (2006.01)
*G06F 3/12* (2006.01)

(52) U.S. Cl.
CPC ..... *H04N 1/00416* (2013.01); *H04N 1/00225* (2013.01); *H04N 1/00244* (2013.01); *H04N 1/00427* (2013.01); *H04N 1/00464* (2013.01); *H04N 1/00474* (2013.01); *H04N 1/00477* (2013.01); *H04N 1/00514* (2013.01); *H04N 1/32625* (2013.01); *H04N 1/32657* (2013.01); *G06F 3/1232* (2013.01); *H04N 2201/001* (2013.01)

(58) Field of Classification Search
CPC .......................... G06F 3/1232; H04N 1/00416
USPC ......................................................... 715/744
See application file for complete search history.

(56) References Cited

U.S. PATENT DOCUMENTS

| | | | | |
|---|---|---|---|---|
| 5,996,029 | A | 11/1999 | Sugiyama et al. | 710/15 |
| 6,631,407 | B1 | 10/2003 | Mukaiyama et al. | 709/223 |
| 7,234,110 | B2 | 6/2007 | Sumitomo | 715/234 |

(Continued)

FOREIGN PATENT DOCUMENTS

| | | | |
|---|---|---|---|
| CN | 101378335 | A | 3/2006 |
| JP | 2000-347975 | A | 12/2000 |

(Continued)

*Primary Examiner* — Sherrod Keaton
(74) *Attorney, Agent, or Firm* — Fitzpatrick, Cella, Harper & Scinto

(57) ABSTRACT

A server provides a file to display a user interface to an information processing apparatus in accordance with a request from the information processing apparatus, and instructs the information processing apparatus to send the device information of the information processing apparatus to the server. The information processing apparatus acquires the device information of the information processing apparatus in accordance with the instruction, and sends, to the server, the device information of the information processing apparatus together with the request of the file to display the user interface. The server receives the device information of the information processing apparatus, and provides, to the information processing apparatus, the file to display the user interface based on the device information of the information processing apparatus. The information processing apparatus displays, based on the provided file, the user interface based on the device information of the information processing apparatus.

5 Claims, 16 Drawing Sheets

(56) References Cited

U.S. PATENT DOCUMENTS

| | | | | |
|---|---|---|---|---|
| 7,978,359 | B2 | 7/2011 | Koarai | 358/1.15 |
| 2003/0011633 | A1* | 1/2003 | Conley | H04L 29/06 715/762 |
| 2004/0236843 | A1* | 11/2004 | Wing | H04L 29/06 709/219 |
| 2004/0239973 | A1 | 12/2004 | Tanaka et al. | 358/1.13 |
| 2005/0076159 | A1* | 4/2005 | Machida | G06F 17/30595 710/1 |
| 2007/0101146 | A1* | 5/2007 | Louch et al. | 713/176 |
| 2007/0140557 | A1 | 6/2007 | Osada | 382/167 |
| 2007/0255428 | A1 | 11/2007 | Nagata | 700/8 |
| 2008/0114734 | A1 | 5/2008 | Suwabe | |
| 2008/0147865 | A1 | 6/2008 | Suwabe | |
| 2008/0148193 | A1 | 6/2008 | Moetteli | 715/854 |
| 2009/0063663 | A1 | 3/2009 | Ikeno | 709/220 |
| 2009/0198811 | A1* | 8/2009 | Yasui | H04L 41/0213 709/223 |
| 2009/0207460 | A1* | 8/2009 | Hikawa et al. | 358/448 |
| 2009/0300519 | A1 | 12/2009 | Sakiyama et al. | 715/753 |
| 2010/0064363 | A1 | 3/2010 | Kano | 726/19 |
| 2010/0231946 | A1 | 9/2010 | Shozaki et al. | 358/1.13 |
| 2010/0268690 | A1 | 10/2010 | Anderson et al. | 707/661 |
| 2011/0072356 | A1 | 3/2011 | Suwabe | |

FOREIGN PATENT DOCUMENTS

| | | | |
|---|---|---|---|
| JP | 2003-296223 | | 10/2003 |
| JP | 2004-297792 | A | 10/2004 |
| JP | 2005-44079 | A | 2/2005 |
| JP | 2007-282136 | A | 10/2007 |
| JP | 2007-299282 | A | 11/2007 |
| JP | 2008-3833 | A | 1/2008 |
| JP | 2007-088665 | | 4/2008 |
| JP | 2009-211523 | A | 9/2009 |
| JP | 2010-238219 | A | 10/2010 |

* cited by examiner

F I G. 5
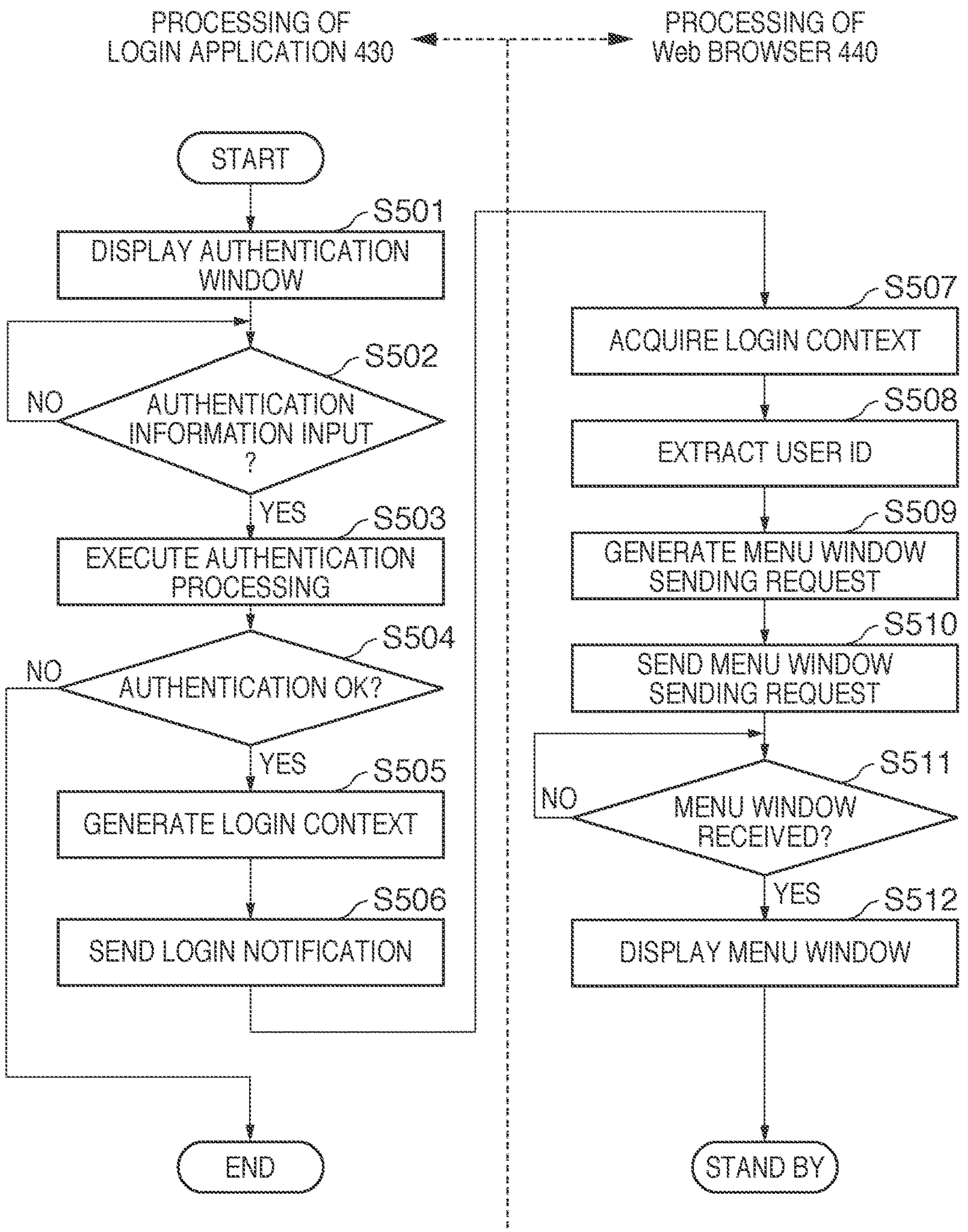

FIG. 7

```
<!DOTYPE···>
<html>
<body>

<!--WHEN OK BUTTON IS PRESSED, ACQUIRE STATE OF MFP AND POST TO "url"-->
<form name="form" method="post" action="url" onSubmit="return check()">
<input type="radio" name="f" id="f_lab0"><label for="f_lab0">SCAN AND SEND TO FTP SERVER</label>
<input type="radio" name="f" id="f_lab1"><label for="f_lab1">SCAN AND SEND BY FAX</label>
<input type="radio" name="f" id="f_lab2"><label for="f_lab2">PRINT</label>
<input type="submit" value="OK">
</form>

<script type="text/javascript">
<!--CHANGE INFORMATION CONFIRMATION CONTENTS OF MFP IN ACCORDANCE WITH SELECTED BUTTON. Web BROWSER EMBEDS STATE IN HEADER-->
function check(){
  for(i=0;i<document.form.f.length;i ++){
   if(document.form.f[i].checked){
     if(i==0){
      <!--CALL FUNCTION PROVIDED BY Web BROWSER AND ACQUIRE INFORMATION OF SCANNER AND NETWORK-->
      <!--CALL FUNCTION OF NATIVE MODULE INSIDE AND ACQUIRE STATE OF MFP-->
        state=browser.getDeviceState1();
     }
     else if(i==1){
      <!--ACQUIRE INFORMATION OF SCANNER AND Fax LINE-->
        state=browser.getDeviceState2();
     {
     else if(i==2){
      <!--ACQUIRE INFORMATION OF PRINTER-->
        state=browser.getDeviceState3();
     }
      else
        return truq
    <!--CALL FUNCTION OF EMBED ACQUIRED INFORMATION IN NEXT HTTP REQUEST HEADER. Web BROWSER EMBEDS STATE IN HEADER-->
     browser.setNextRequestHeader(state);
     return truq;
    }
  }
}
</body>
</form>
```

701 702 703 704 705 706

SYSTEM, USER INTERFACE DISPLAY CONTROL METHOD, SERVER, INFORMATION PROCESSING APPARATUS AND STORAGE MEDIUM

BACKGROUND OF THE INVENTION

Field of the Invention

The present invention relates to a system including a server for providing a file to display a user interface, and a user interface display control method, a server, and an information processing apparatus and a storage medium.

Description of the Related Art

An information processing apparatus such as a PC connected to a Web server on a network is widely known in general to display, on a Web browser, an operation window provided by the Web server. In such a configuration, first, the Web browser of the information processing apparatus requests the operation window of the Web server. Then, in response to the request from the information processing apparatus, a Web application on the Web server sends an HTML file that causes the Web browser to display the operation window to the information processing apparatus. The Web browser of the information processing apparatus analyzes the received HTML file, and displays the operation window based on the description of the HTML file. When the user inputs an instruction in the operation window displayed on the Web browser, the Web browser of the information processing apparatus notifies the Web server of the instruction. Upon receiving the notification, the Web application on the Web server executes processing in accordance with the input instruction.

In recent years, an MFP (Multi Function Peripheral) having a scanner and printer also includes a Web browser. The MFP can display the operation window provided by the Web server on the Web browser, and receive various kinds of instructions from the user in accordance with the above-described procedure. The Web server can also express an operation instruction for the MFP or acquire information from it and handle window updating based on a Java®Script incorporated in an HTML file or metadata added to an HTML file. In many cases, both the MFP and the Web server introduce a user authentication mechanism. In this case, the user login/logout state in the MFP and that in the Web application running on the Web server side need to appropriately synchronize.

According to the description of Japanese Patent Laid-Open No. 2003-296223, a Web server prepares pages in a plurality of languages corresponding to the same window. Upon receiving a window acquisition request from the Web browser of the MFP, the Web server sends the page of a corresponding language to the MFP based on the received language information. Hence, even when the user is in a plurality of language environments, the Web server can send, to the Web browser of the MFP, window information corresponding to the request from the MFP.

A file for a user interface on an information processing apparatus except the Web server is provided by the Web application on the Web server. Hence, the Web application should notify the information processing apparatus of a file for a more appropriate window. When the information processing apparatus is an MFP, it often executes a function that combines a plurality of processes such as scan and sending. The Web server cannot send an appropriate window to the MFP without receiving the pieces of device information of devices for executing individual functions. For efficient communication between apparatuses, device information is preferably sent to the server at a window transition timing based on a user instruction on the user interface window of the MFP.

SUMMARY OF THE INVENTION

An aspect of the present invention is to eliminate the above-mentioned problems with the conventional technology.

The present invention provides a system which requests, of an information processing apparatus, a file to display a user interface, and instructs to send the device information of the information processing apparatus to a server, a user interface display control method, a server, and an information processing apparatus and a storage medium.

The present invention in its first aspect provides a system including an information processing apparatus for displaying a user interface and a server for providing a file to display the user interface in accordance with a request from the information processing apparatus, the server comprises an instruction unit configured to provide the file to display the user interface to the information processing apparatus in accordance with the request from the information processing apparatus, and instruct the information processing apparatus to send device information of the information processing apparatus to the server;

a reception unit configured to receive the device information of the information processing apparatus sent from the information processing apparatus in accordance with the instruction from the instruction unit; and a providing unit configured to provide, to the information processing apparatus, the file to display the user interface based on the device information of the information processing apparatus, and the information processing apparatus comprises an acquisition unit configured to acquire the device information of the information processing apparatus in accordance with the instruction from the instruction unit;

a sending unit configured to send, to the server, the device information of the information processing apparatus acquired by the acquisition unit together with the request of the file to display the user interface; and a display unit configured to display, based on the file provided by the providing unit, the user interface based on the device information of the information processing apparatus.

The present invention in its second aspect provides a user interface display control method executed in a system including an information processing apparatus for displaying a user interface and a server for providing a file to display the user interface in accordance with a request from the information processing apparatus, comprising the steps of:

in the server, providing the file to display the user interface to the information processing apparatus in accordance with the request from the information processing apparatus, and instructing the information processing apparatus to send device information of the information processing apparatus to the server;

in the information processing apparatus, acquiring the device information of the information processing apparatus in accordance with the instruction in the step of providing the file and instructing the information processing apparatus;

in the information processing apparatus, sending, to the server, the device information of the information processing apparatus acquired in the step of causing the information processing apparatus to acquire the device information together with the request of the file to display the user interface;

in the server, receiving the device information of the information processing apparatus sent in the step of causing the information processing apparatus to send the device information;

in the server, providing, to the information processing apparatus, the file to display the user interface based on the device information of the information processing apparatus; and in the information processing apparatus, displaying, based on the file provided in the step of causing the server to provide the file, the user interface based on the device information of the information processing apparatus.

The present invention in its third aspect provides a server for providing a file to display a user interface in accordance with a request from an external apparatus, comprising:

an instruction unit configured to provide the file to display the user interface to the external apparatus in accordance with the request from the external apparatus, and instruct the external apparatus to send device information of the external apparatus to the server;

a reception unit configured to receive the device information of the external apparatus sent from the external apparatus in accordance with the instruction from the instruction unit; and a providing unit configured to provide, to the external apparatus, the file to display the user interface based on the device information of the external apparatus.

The present invention in its fourth aspect provides a computer-readable storage medium storing a program executed in a server for providing a file to display a user interface in accordance with a request from an external apparatus, the program causing a computer to function to:

provide the file to display the user interface to the external apparatus in accordance with the request from the external apparatus, and instruct the external apparatus to send device information of the external apparatus to the server;

receive the device information of the external apparatus sent from the external apparatus in accordance with the instruction; and provide, to the external apparatus, the file to display the user interface based on the device information of the external apparatus.

The present invention in its fifth aspect provides an information processing apparatus for displaying a user interface based on a file provided by a server to display the user interface, comprising:

a reception unit configured to receive, from the server, an instruction to send device information of the information processing apparatus to the server;

an acquisition unit configured to acquire the device information in accordance with the instruction received by the reception unit;

a sending unit configured to send, to the server, the device information acquired by the acquisition unit together with a request of the file to display the user interface; and a display unit configured to display, based on the file provided by the server, the user interface based on the device information.

The present invention in its sixth aspect provides a computer-readable storage medium storing a program executed in an information processing apparatus for displaying a user interface based on a file provided by a server to display the user interface, the program causing a computer to function to:

receive, from the server, an instruction to send device information of the information processing apparatus to the server;

acquire the device information in accordance with the received instruction;

send, to the server, the acquired device information together with a request of the file to display the user interface; and display, based on the file provided by the server, the user interface based on the device information.

According to the present invention, it is possible to send the device information of an information processing apparatus to a server at a timing the user interface on the information processing apparatus transits.

Further features of the present invention will become apparent from the following description of exemplary embodiments with reference to the attached drawings.

BRIEF DESCRIPTION OF THE DRAWINGS

FIG. 5 is a flowchart illustrating the procedure of processing of causing an MFP to request an operation window;

FIG. 7 is a view showing an example of an HTML file representing window information;

DESCRIPTION OF THE EMBODIMENTS

Figure 1:
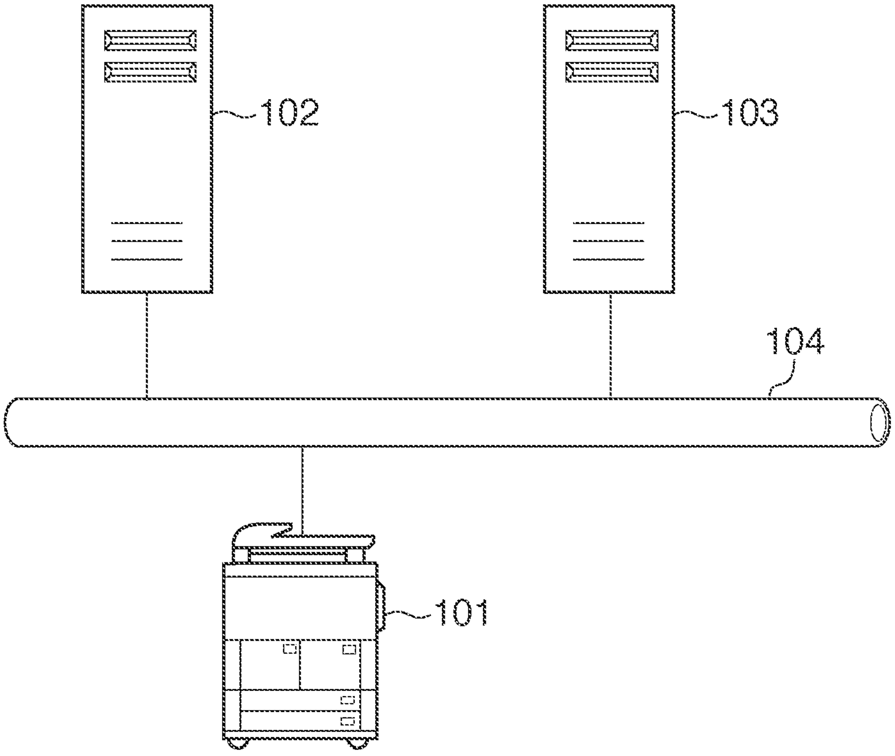
FIG. 1 is a view showing the overall arrangement of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that the same reference numerals denote the same constituent elements, and a description thereof will be omitted.

[First Embodiment]

User interface display control will be described in which an MFP acquires information in it at a user interface window transition timing, and then sends the next request including the information, and a Web application in a Web server presents an appropriate window to the MFP.

FIG. 1 is a view showing the overall arrangement of a system according to this embodiment. An MFP 101 serving as an information processing apparatus, an LDAP (Lightweight Directory Access Protocol) server 102, and a Web server 103 are connected to a LAN 104 so as to be mutually communicable with each other. An FTP (File Transfer Protocol) server (not shown) is also connected to the LAN 104 so that the MFP 101 can send image data to the FTP server by FTP.

Figure 2:
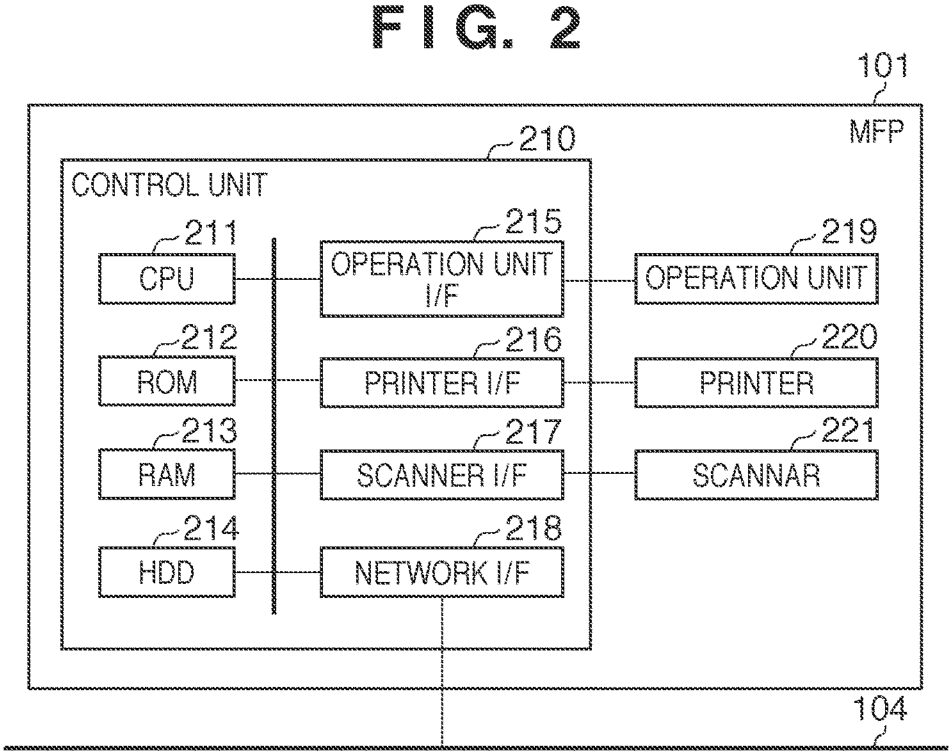
FIG. 2 is a block diagram showing the arrangement of an MFP.

FIG. 2 is a block diagram showing the arrangement of the MFP 101. A control unit 210 including a CPU 211 controls the operation of the entire MFP 101. The CPU 211 reads out control programs stored in a ROM 212, and executes various kinds of control processing such as reading control and sending control. A RAM 213 is used as a temporary storage area such as the main memory or work area of the CPU 211. An HDD 214 stores image data, various kinds of programs, and the like. An operation unit I/F 215 connects an operation unit 219 to the control unit 210. The operation unit 219 includes a liquid crystal display unit having a touch panel function, a keyboard, and the like. The MFP 101 has a Web browser function to be described later. The Web browser of the MFP 101 analyzes an HTML file received from the Web server 103, and displays, on the operation unit 219, an operation window based on the description of the HTML file. A printer I/F 216 connects a printer 220 to the control unit 210. Image data to be printed by the printer 220 is transferred from the control unit 210 to the printer 220 via the printer I/F 216, and printed on a printing medium by the printer 220. A scanner I/F 217 connects a scanner 221 to the control unit 210. The scanner 221 reads an image of a document, generates image data, and inputs it to the control unit 210 via the scanner I/F 217. A network I/F 218 connects the control unit 210 to the LAN 104. The network I/F 218 sends image data or information to another apparatus (for example, the LDAP server 102 or the Web server 103) on the LAN 104, or receives various kinds of information from another apparatus on the LAN 104.

Figure 3:
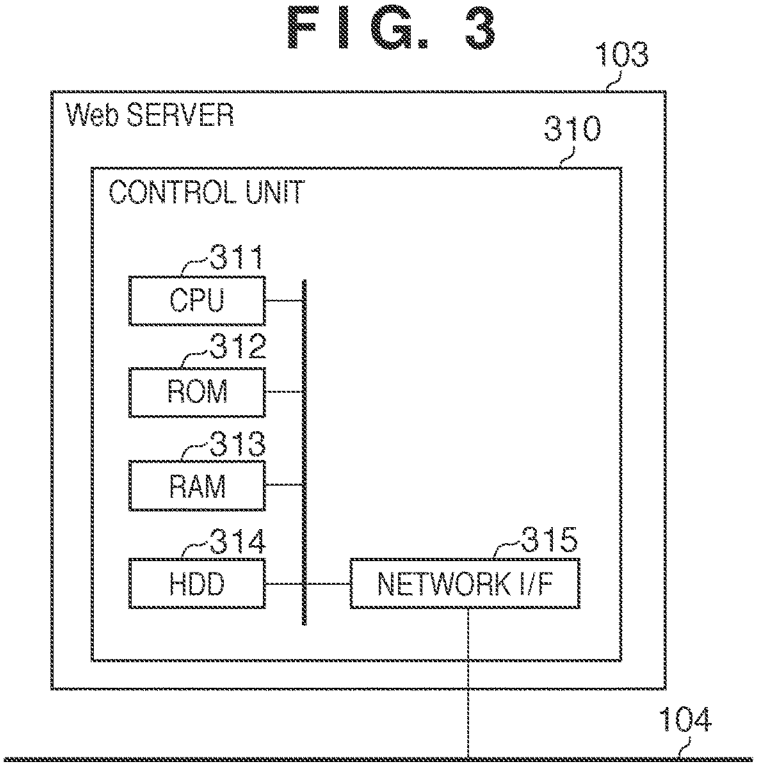
FIG. 3 is a block diagram showing the arrangement of a Web server.

FIG. 3 is a block diagram showing the arrangement of the Web server 103. A control unit 310 including a CPU 311 controls the operation of the entire Web server 103. The CPU 311 reads out control programs stored in a ROM 312, and executes various kinds of control processing. A RAM 313 is used as a temporary storage area such as the main memory or work area of the CPU 311. An HDD 314 stores image data, various kinds of programs, and various kinds of information tables to be described later. A network I/F 315 connects the control unit 310 to the LAN 104. The network I/F 315 sends/receives various kinds of information to/from another external apparatus on the LAN 104.

Figure 4:
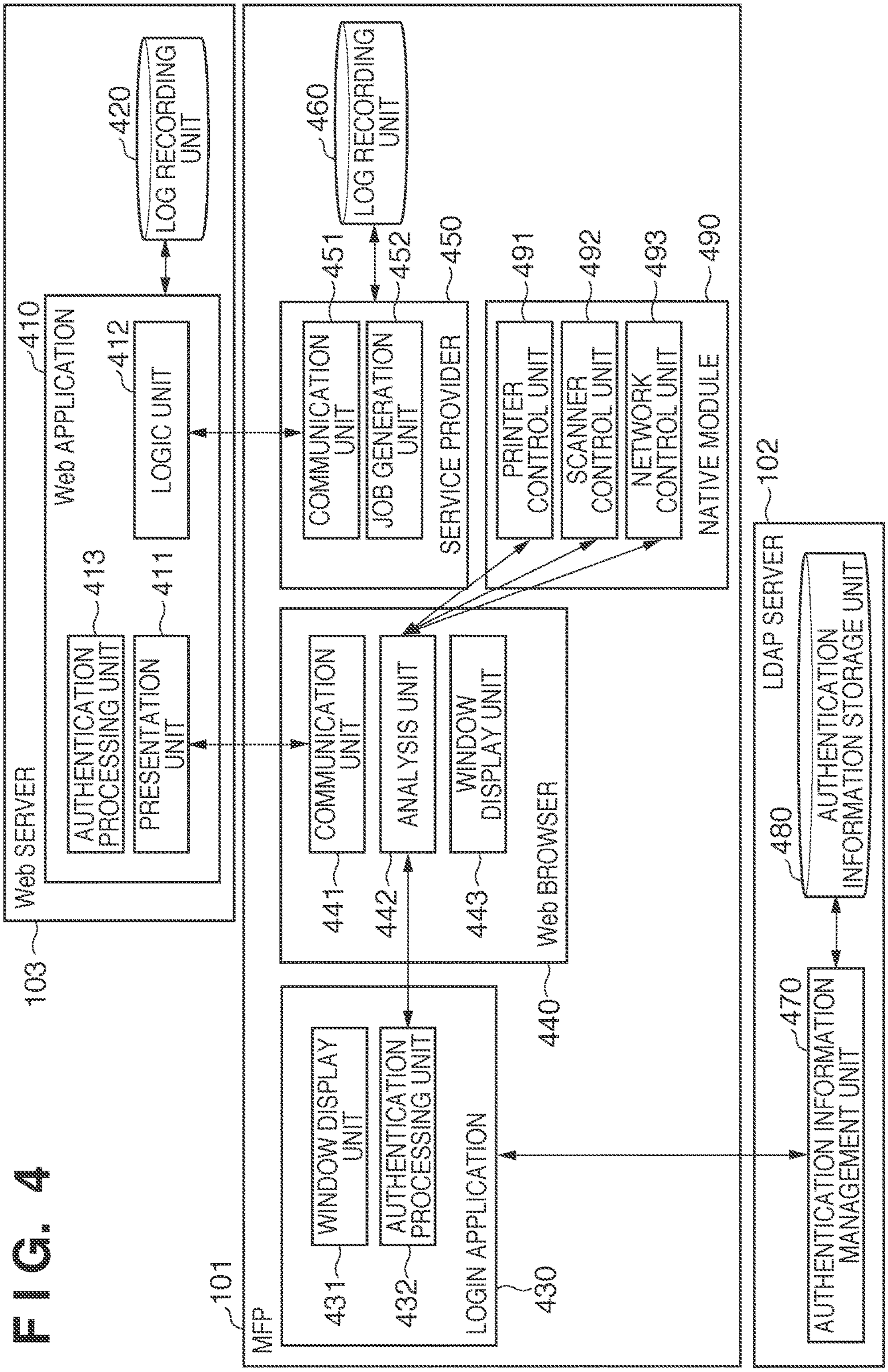
FIG. 4 is a block diagram for explaining the software configuration of the system.

FIG. 4 is a block diagram for explaining the software configuration of the system. The functional units shown in FIG. 4 are implemented by causing the CPUs included in the MFP 101, LDAP server 102, and Web server 103, respectively, to execute control programs.

The MFP 101 includes a login application 430, Web browser 440, service provider 450, log recording unit 460, and native module 490. The login application 430 includes a window display unit 431 and an authentication processing unit 432. The window display unit 431 displays, on the operation unit 219, an authentication window to cause the user to input authentication information necessary for authentication processing to be executed by the authentication processing unit 432. Note that the authentication window is not provided by the Web server 103 but displayed by causing the login application 430 to read out information held in the MFP 101. When the user has input authentication information via the authentication window displayed by the window display unit 431, the authentication processing unit 432 performs user authentication processing using the input authentication information.

The LDAP server 102 includes an authentication information management unit 470 and an authentication information storage unit 480. The authentication information storage unit 480 stores, in advance, authentication information corresponding to users who are permitted to use the MFP 101. The authentication information management unit 470 manages the authentication information stored in the authentication information storage unit 480. When performing authentication processing, the authentication processing unit 432 collates the authentication information input via the authentication window displayed by the window display unit 431 with the authentication information stored in the authentication information storage unit 480. In accordance with the collation result, the user is permitted to use the MFP 101.

The Web browser 440 includes a communication unit 441, analysis unit 442, and window display unit 443. The communication unit 441 communicates with a presentation unit 411 of a Web application 410 in accordance with the HTTP protocol. For example, the communication unit 441 requests the Web application 410 to send an operation window to be displayed on the Web browser 440, or notifies the Web application 410 of a user instruction input via the operation window displayed on the Web browser 440. The analysis unit 442 analyzes an HTML file received from the Web application 410. The HTML file describes the contents of an operation window to be displayed on the Web browser. The analysis unit 442 also analyzes a Java®Script incorporated in an HTML file or metadata (for example, an added XML file) added to an HTML file. The window display unit 443 displays an operation window on the operation unit 219 based on the analysis result of the analysis unit 442.

The native module 490 includes a printer control unit 491, scanner control unit 492, and network control unit 493. The printer control unit 491 acquires the information of the printer 220 via the printer I/F 216. The scanner control unit 492 acquires the information of the scanner 221 via the scanner I/F 217. The network control unit 493 acquires the state of the LAN 104 via the network I/F 218. In accordance with an instruction of the Java®Script incorporated in the HTML file or the added metadata, the analysis unit 442 of the Web browser 440 inquires of the native module 490 about whether the MFP 101 can normally operate. Similarly, the analysis unit 442 inquires of the login application 430 about the user's login/logout state.

The Web server 103 includes the Web application 410 and a log recording unit 420. The Web application 410 includes the presentation unit 411, logic unit 412, and authentication processing unit 413. The presentation unit 411 communicates with the communication unit 441 of the Web browser 440 in the MFP 101, and sends, to the MFP 101, an operation window to be displayed on the Web browser 440 of the MFP 101 in response to a request from it. The presentation unit 411 also receives, from the MFP 101, a user instruction input via the operation window displayed on the Web browser 440 of the MFP 101. Requests from the Web browser 440 of the MFP 101 include user information such as login/logout information.

In accordance with an instruction from the presentation unit 411, the authentication processing unit 413 stores information (for example, login/logout information) equal to the user information received by the presentation unit 411. To request the MFP 101 to execute processing, the logic unit 412 communicates with a communication unit 451 in the service provider 450. For example, the logic unit 412 requests execution of print processing by the printer 220 of the MFP 101, execution of read processing by the scanner 221, or execution of send processing via the network I/F 218. The logic unit 412 receives the process result. The log recording unit 420 records the result of processing executed by the MFP 101. The process result is written in the log recording unit 420 at a timing it the logic unit 412 has received the process result. Note that the log recording unit 420 also records the progress of updating of the user information (for example, login/logout information) updated in the Web server 103. This information is written in accordance with an instruction from the authentication processing unit 413.

The service provider 450 includes the communication unit 451 and a job generation unit 452. The communication unit 451 receives a process request from the logic unit 412 in the Web application 410. When the Web application 410 has requested execution of processing, the job generation unit 452 generates a job to execute the requested processing, and executes the job. The log recording unit 460 records the job execution result. Note that the log recording unit 460 also records a result of authentication processing executed by the login application 430 and the log of communications with the Web server 103.

FIG. 5 is a flowchart illustrating the procedure of processing of causing the MFP 101 to perform user authentication processing and send authentication information used for the authentication processing to the Web server 103, thereby requesting an operation window to be displayed on the Web browser of its own. The operations shown in the flowchart of FIG. 5 are implemented by causing the CPU 211 of the MFP 101 to execute control programs. Note that steps S501 to S506 are executed by the login application 430, and the Web browser 440 executes steps S507 to 5512.

Figure 6:
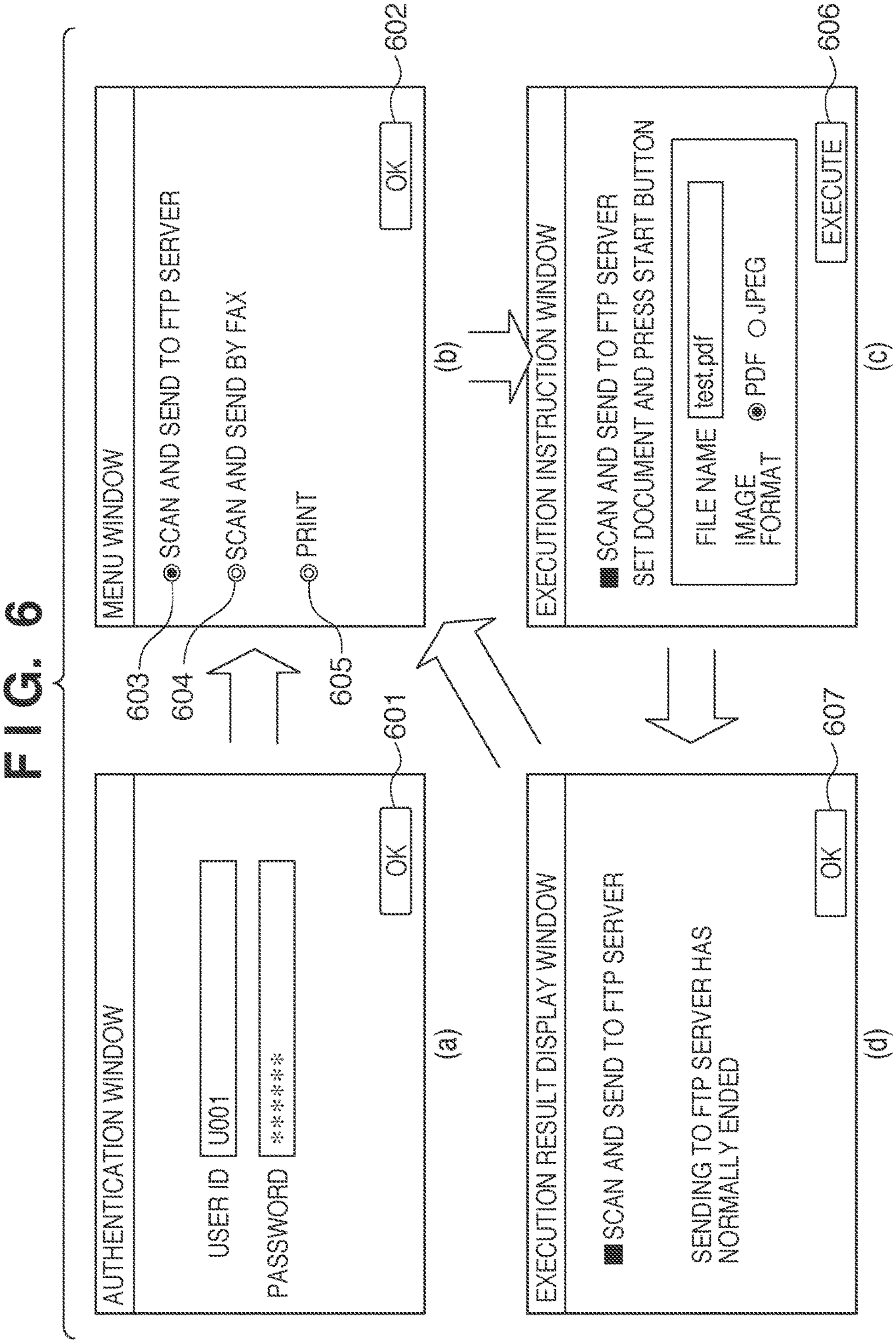
FIG. 6 shows views of examples of user interfaces displayed on the MFP.

In step S501, the window display unit 431 displays an authentication window on the operation unit 219. In FIG. 6 (a) is a view showing an example of the authentication window displayed in step S501. The windows indicated by (a), (b), (c), and (d) in FIG. 6 are similarly displayed on the operation unit 219. The MFP 101 detects user input of a user ID and password via the authentication window indicated by (a) in FIG. 6.

In step S502, the window display unit 431 determines whether the user has input authentication information. This determination is done based on, for example, whether an OK button 601 of the authentication window indicated by (a) in FIG. 6 has been pressed. Upon determining that the authentication information has been input, the process advances to step S503. The process in step S502 is repeated until it is determined that the authentication information has been input.

In step S503, the authentication processing unit 432 executes authentication processing using the input user ID and password. In step S504, the authentication processing unit 432 communicates with the LDAP server 102, and collates the input user ID and password with information stored in the authentication information storage unit 480 in advance. If the user has normally been authenticated as the result of authentication processing, the process advances to step S505. If the user has not been authenticated, the processing ends. In step S505, the authentication processing unit 432 generates a login context corresponding to the authenticated user. The login context is information representing the authenticated user, and includes the user ID input via the authentication window indicated by (a) in FIG. 6. In step S506, the authentication processing unit 432 notifies the Web browser 440 that the user authentication has normally ended, and the user has logged in (login event).

In step S507, the analysis unit 442 of the Web browser 440 acquires the login context generated by the login application 430. In step S508, the analysis unit 442 extracts, from the acquired login context, the user ID input by the user via the authentication window indicated by (a) in FIG. 6. In step S509, the analysis unit 442 generates a menu window sending request to request the Web server 103 to send a menu window that is one of operation windows to be displayed on the Web browser of the MFP 101 and used by the user to instruct execution of processing. The menu window sending request includes the user ID extracted in step S508. In step S510, the communication unit 441 sends the menu window sending request generated by the analysis unit 442 to the Web server 103.

In step S511, the communication unit 441 determines whether the Web server 103 has sent a menu window in response to the menu window sending request sent in step S510. For example, an HTML file is sent from the Web server 103 as window information to display the menu window on the Web browser. Upon determining that the Web server 103 has sent the menu window, the process advances to step S512. Upon determining that the menu window is not received, step S511 is repeated until the menu window is received. In step S512, the window display unit 443 displays a menu window as indicated by (b) in FIG. 6 in accordance with the description of the received HTML file.

In FIG. 6, (b) is a view showing an example of the menu window displayed in step S512. In FIG. 6, a menu for using a function of the MFP 101 is displayed in (b). For example, in this embodiment, a function 603 "scan and send to FTP server", a function 604 "scan and send by Fax", and a function 605 "print" are displayed as selection buttons. When the user selects one of the selection buttons, and the Web browser 440 detects press of an OK button 602, the window transits to an execution instruction window as indicated by (c) in FIG. 6. The window transition is done as in the processes of steps S509 to 5512 in (a) of FIG. 6. However, processing upon detecting press of the OK button 602 is different from the above-described process. This will be described later with reference to FIG. 7.

In FIG. 6, (c) is a view showing an example of a window to execute a selected function. The window indicated by (c) in FIG. 6 is used to instruct to read an image of a document to generate image data using the scanner 221 of the MFP 101 and send the generated image data to the FTP server on the LAN 104. The window indicated by (c) in FIG. 6 is set to generate image data of PDF format and add a file name "test.pdf". Upon detecting press of an execute button 606, the processing is actually executed. When the processing is completed, the window transits to an execution result display window as indicated by (d) in FIG. 6. The window transition is done as in the processes of steps S509 to 5512 in (a) of FIG. 6.

In FIG. 6, (d) is a view for explaining an example of a window to display the execution result. In (d) of FIG. 6, the execution result is presented to the user. Upon detecting press of an OK button 607, the window returns to that indicated by (b) in FIG. 6. The window transition is done as in the processes of steps S509 to 5512 in (a) of FIG. 6.

FIG. 7 is a view showing part of an HTML file representing the window information of the execution instruction window indicated by (b) in FIG. 6. The HTML file is sent from the Web server 103, and analyzed by causing the CPU 211 of the MFP 101 to execute a control program. A portion for causing the MFP 101 to acquire the information of its own and put the information in the next HTTP request at a window transition timing will be described below. A portion 701 of Java®Script of the HTML file shown in FIG. 7 is processed when one of the function selection buttons 603 to 605 is selected, and the Web browser 440 detects press of the OK button 602.

Upon detecting press of the OK button, the Web browser 440 calls a check function 702. In the check function 702, a portion 703 determines the selected button, and confirms the device information. For example, when the function 603 "scan and send to FTP server" is selected, it is necessary to confirm the information of the scanner 221 and network (LAN 104) to implement the function. Hence, a portion 704 confirms the selection state, and calls a browser.getDeviceState1 function. The browser.getDeviceState1 function is held by the Web browser 440 to confirm the information of the scanner 221 and network (LAN 104) via the native module 490.

Similarly, when the function 604 "scan and send by Fax" or function 605 "print" is selected, information confirmation is done as indicated by a portion 705. In this case as well, the Web browser 440 confirms the information of the scanner 221, Fax line (not shown), and printer 220 via the native module 490. The pieces of information acquired by the portions 704 and 705 are embedded in the HTTP request header by calling a browser.setNextRequestHeader function 706 provided by the Web browser 440.

When these processes are completed in the check function 702, the process returns to the portion 701 to execute sending processing (post processing) to a URL (a URL that exists in the Web server 103) set in accordance with the HTML. In this sending processing, the communication unit 441 of the Web browser 440 functions so as to send the information of the MFP 101 set above to the Web server 103. Note that in this embodiment, HTML and Java®Script have been exemplified. However, any other method is usable. For example, instead of embedding the information of the MFP 101 in the HTTP request header, the information may be added to the set URL. As another example, instead of issuing a sending instruction on HTML (submit process), the whole process may be done in the Java®Script (the submit process is described in the Java®Script). A detailed description thereof will be omitted.

In FIG. 7, acquiring the information of the MFP 101 necessary for the function "scan and send to FTP server" is described. This is because the scanner 221 needs to normally operate for execution of scan (document reading). Conversely, the state of the scanner 221 need not be acquired in other windows. Hence, only the window information of the menu window indicated by (b) in FIG. 6 includes the above-described contents.

In this embodiment, logout information is not acquired at the window transition timing. Instead, the Web browser 440 detects a notification from the login application 430. This processing is also implemented by causing the CPU 211 of the MFP 101 to execute a control program. Upon detecting logout due to some reason (for example, press of a logout key (not shown) of the operation unit 219), the authentication processing unit 432 in the login application 430 notifies the analysis unit 442 of the Web browser 440 of it. The analysis unit 442 sends the information to the communication unit 441. The communication unit 441 includes the logout information in the next HTTP request.

Figure 8:
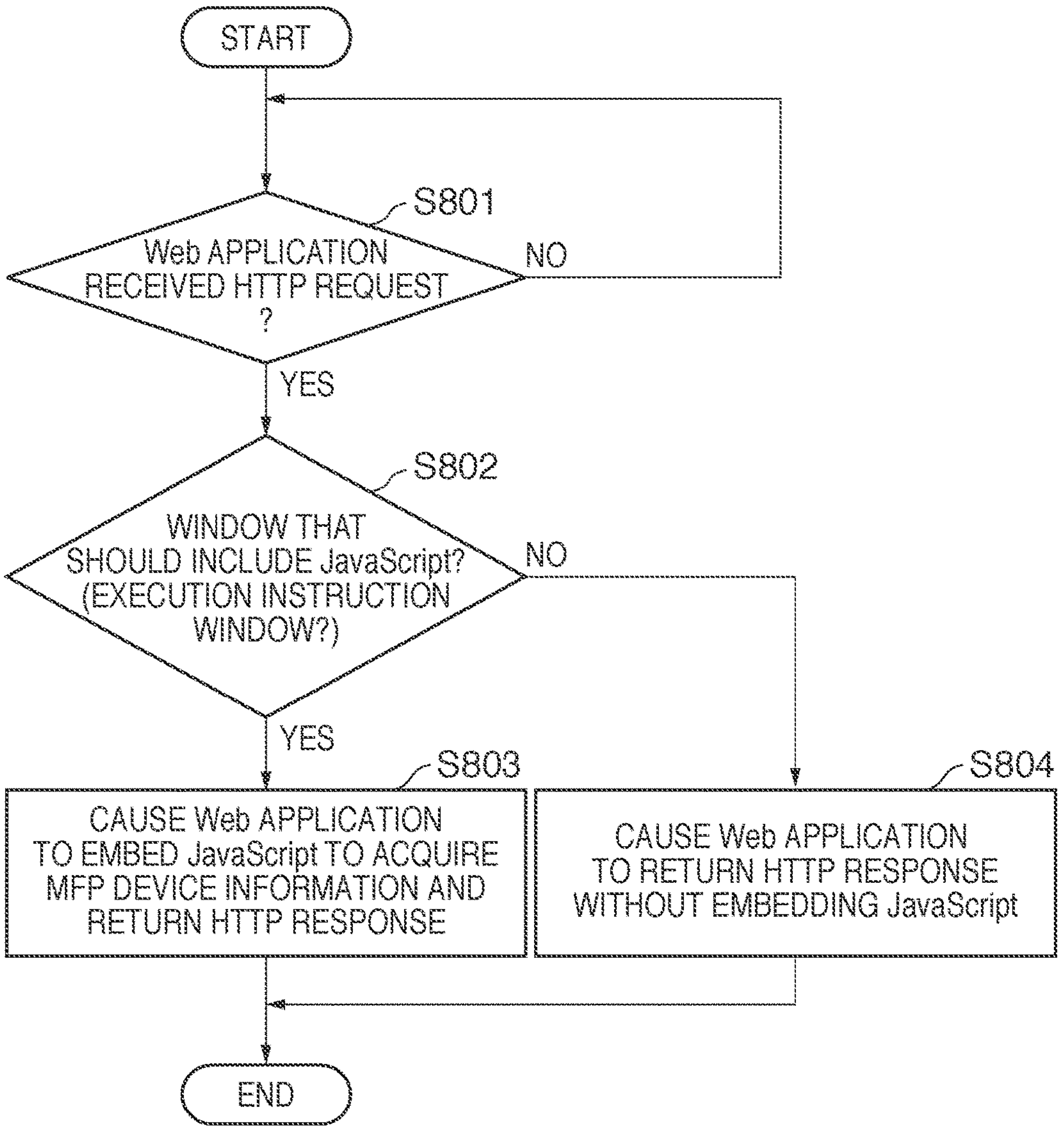
FIG. 8 is a flowchart illustrating processing when the Web server has received a request.

FIG. 8 is a flowchart illustrating the procedure of processing when the Web server 103 has received an HTTP request from the MFP 101. Especially, the difference in window creation between (c) of FIG. 6 including the Java®Script and (a), (b), and (d) of FIG. 6 will be explained. Note that the processes shown in the flowchart of FIG. 8 are implemented by causing the CPU 311 of the Web server 103 to execute control programs. In step S801, the presentation unit 411 of the Web application 410 of the Web server 103 determines whether an HTTP request from the MFP 101 has been received. Upon determining that an HTTP request has been received, the process advances to step S802.

Step S801 is repeated until reception is determined. In step S802, the presentation unit 411 determines whether the window should include the Java®Script. An example of the window is the execution window indicated by (c) in FIG. 6 for the function "scan and send to FTP server" listed in (b) of FIG. 6. Another example of the window that should include the Java®Script is the execution instruction window of the function "scan and send by Fax" or function "print" (not shown). These windows are predetermined and held by the presentation unit 411. The presentation unit 411 performs determination based on them. Upon determining in step S802 that the window should include the Java®Script, in step S803, the presentation unit 411 sends, to the MFP 101 as an HTTP response, window information in which the Java®Script to acquire MFP device information is embedded. Upon determining that the window should not include the Java®Script, the process advances to step S804. The presentation unit 411 sends an HTTP response without including the Java®Script to the MFP 101.

Figure 9A:
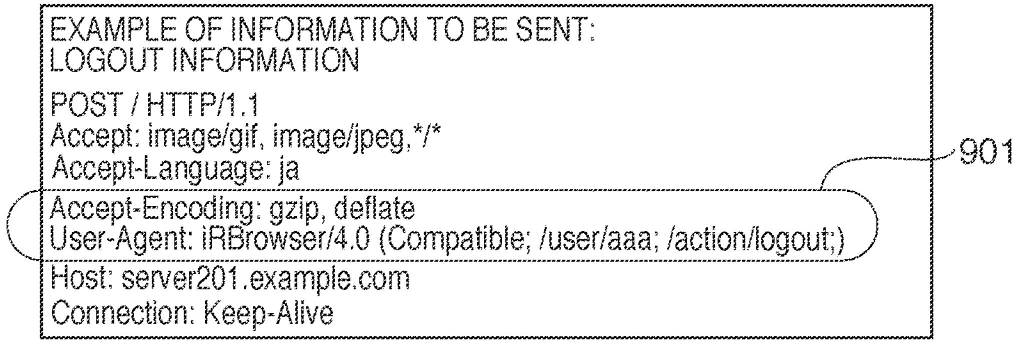
FIGS. 9A, 9B, and 9C are views for explaining device information included in a request.
Figure 9B:
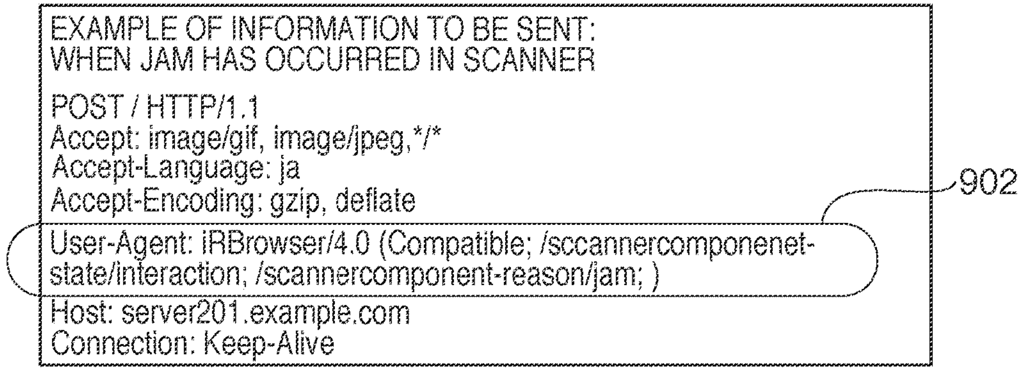
Figure 9C:
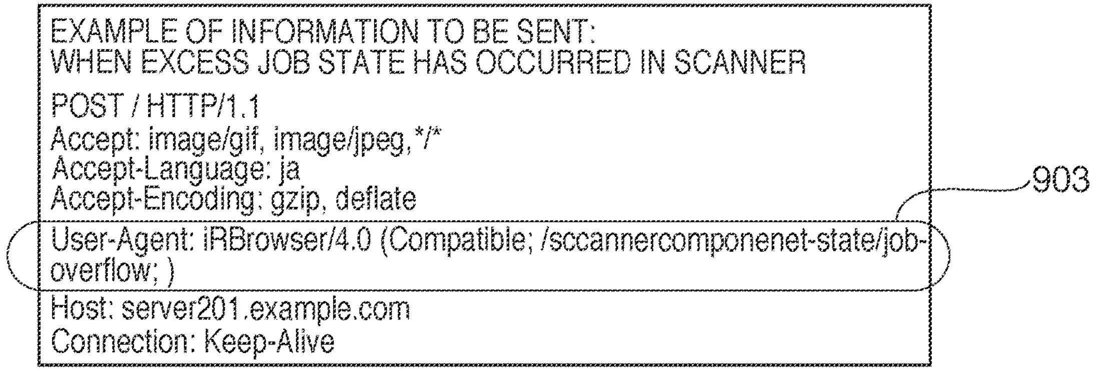

FIGS. 9A, 9B, and 9C are views for explaining information included in an HTTP request so as to make the Web browser 440 of the MFP 101 send the information (device information) of the MFP 101 to the Web server 103 in FIG. 7. The information is processed by the CPU 211 of the MFP 101. A portion 901 in FIG. 9A is an example of logout information. The User-Agent column of the HTTP request header includes information representing that a user aaa has logged out. A portion 902 in FIG. 9B is an example of information representing jam (paper jam) in the scanner 221. The User-Agent column represents that the scanner 221 is in an interaction state, which is caused by jam. FIG. 9C shows an example when the number of jobs of the scanner 221 has exceeded the upper limit. The upper limit of the number of jobs receivable by the scanner 221 is held by the scanner control unit 492 of the native module 490. The above-described event occurs when the number of jobs has exceeded the upper limit. A detailed description of a job will be omitted. A portion 903 in FIG. 9C indicates an example of including information in the HTTP request header. In this embodiment, an example in which information is included in the User-Agent column of an HTTP request header has been described. However, the method is not limited to this.

Figure 10A:
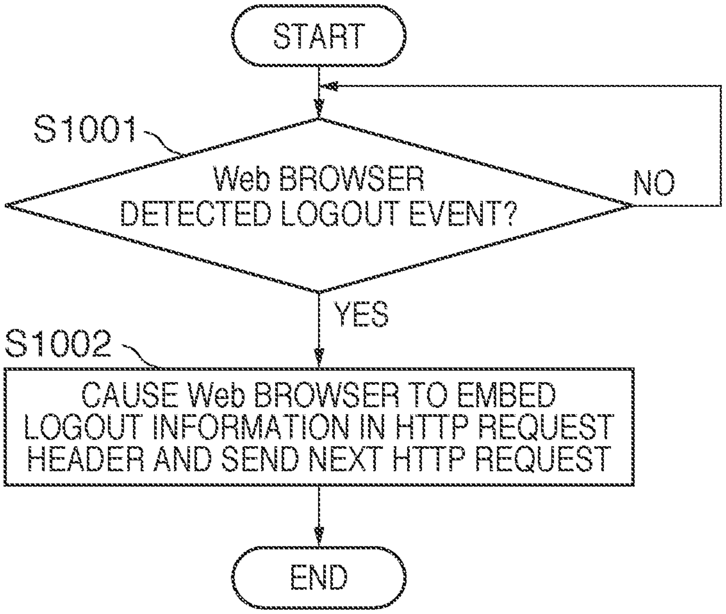
FIGS. 10A and 10B are flowcharts illustrating processing of sending a request including MFP information.
Figure 10B:
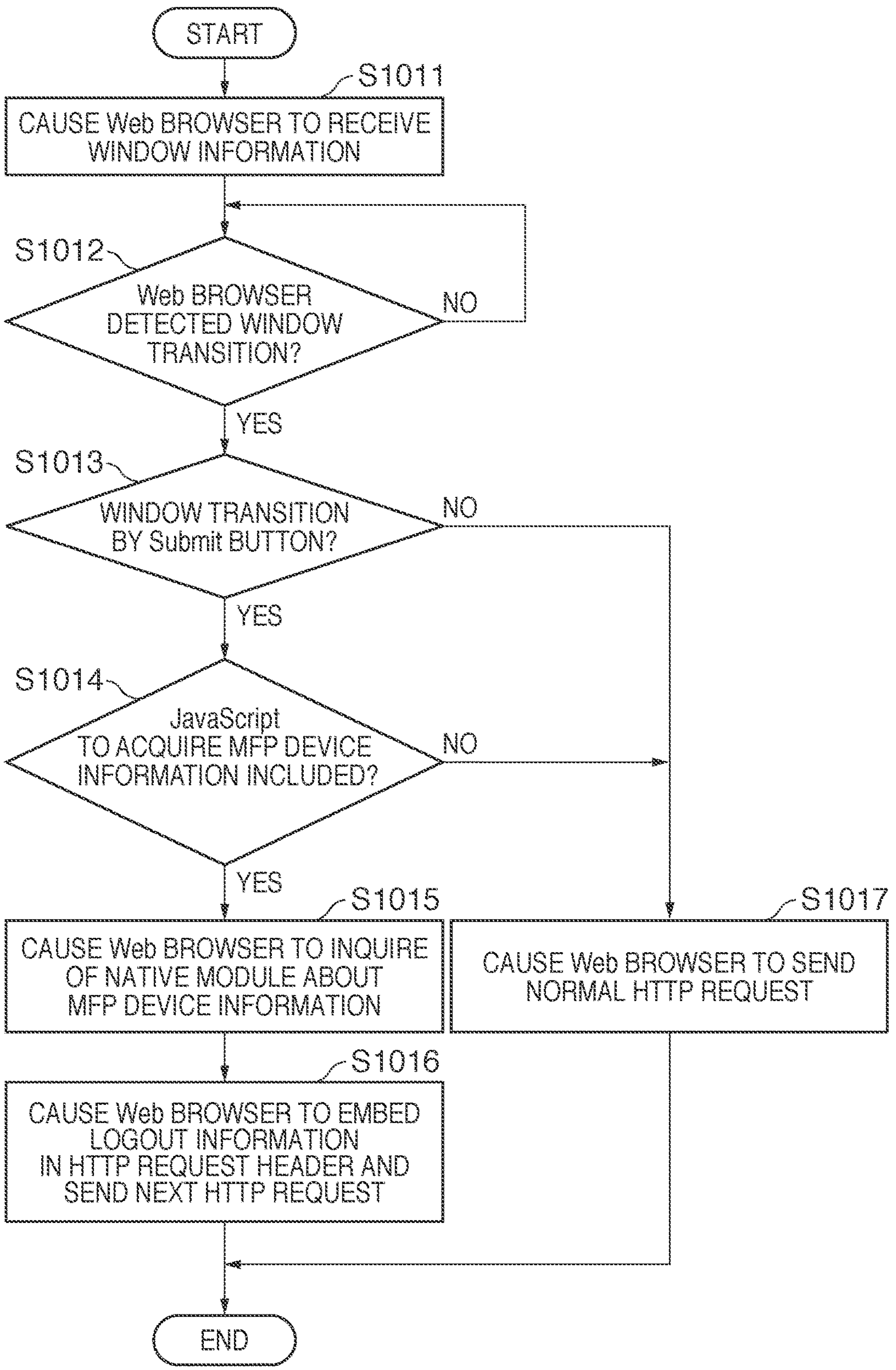

Procedures corresponding to the contents shown in (a) to (d) of FIG. 6, FIG. 7, and FIGS. 9A to 9C will be described with reference to FIGS. 10A, 10B, and 11. The flowcharts of FIGS. 10A and 10B are processes to be executed by the MFP 101, which are implemented by causing the CPU 211 of the MFP 101 to execute control programs. FIG. 10A is a flowchart of causing the MFP 101 to send logout information to the Web server 103. In step S1001, the Web browser 440 determines whether a logout event sent from the login application 430 has been detected. The process in step S1001 is repeated until a logout event is detected. Upon detecting a logout event notification, the process advances to step S1002. In step S1002, the analysis unit 442 of the Web browser 440 sends the logout information to the communication unit 441. The communication unit 441 puts the logout information in the next HTTP request, and sends the information to the Web server 103 by the next HTTP request.

FIG. 10B is a flowchart of causing the MFP 101 to send acquired MFP device information to the Web server 103. In step S1011, the Web browser 440 receives window information from the Web application 410 of the Web server 103. In step S1012, the Web browser 440 determines whether window transition has been detected. The process in step S1012 is repeated until window transition is detected. When the Web browser 440 detects window transition, the process advances to step S1013 to determine whether the window transition is caused by the submit button. Upon determining that the window transition is not caused by the submit button, the process advances to step S1017 to send a normal HTTP request. Upon determining in step S1013 that the window transition is caused by the submit button, the process advances to step S1014 to determine whether the window includes Java®Script to acquire MFP device information. Upon determining that the window includes no Java®Script, the process advances to step S1017 to send a normal HTTP request. Upon determining that the window includes Java®Script, the process advances to step S1015. In step S1015, the Web browser 440 inquires of the native module 490 about the MFP device information (the portion 703 in FIG. 7). In step S1016, the acquired MFP device information is put in the HTTP request, and sent to the Web server 103 (the portion 704 in FIG. 7).

Figure 11:
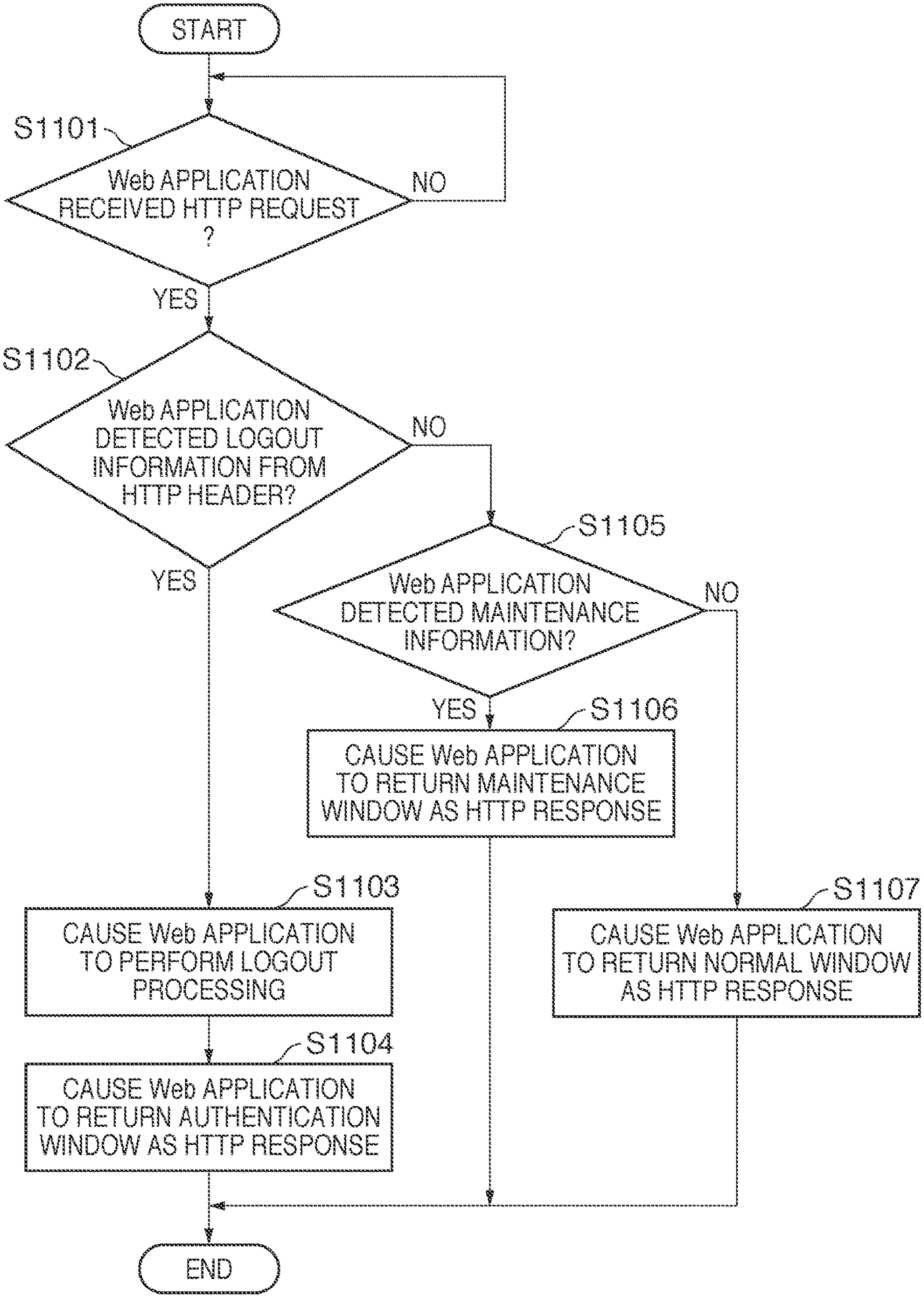
FIG. 11 is a flowchart illustrating processing of causing the Web server to change the response window.

FIG. 11 is a flowchart for explaining an operation of causing the Web server 103 to receive an HTTP request from the MFP 101 and change the response window in accordance with the information included in the HTTP request. The operations shown in the flowchart of FIG. 11 are implemented by causing the CPU 311 of the Web server 103 to execute control programs. In step S1101, the Web application 410 determines whether an HTTP request from the MFP 101 has been received. The process in step S1101 is repeated until it is determined that an HTTP request is received. Upon determining that an HTTP request has been received, the process advances to step S1102. The Web application 410 determines whether logout information has been detected from the HTTP request header. Upon determining that logout information is included, the process advances to step S1103 to clear login/logout information held by the authentication processing unit 413 in the Web application 410.

In step S1104, the Web server 103 sends the information of the authentication window indicated by (a) in FIG. 6 to the MFP 101 as an HTTP response. If it is determined in step S1102 that the information included in the HTTP request header is not logout information, the process advances to step S1105 to determine whether the MFP device information of the MFP 101 is information (failure information) representing the necessity of maintenance. In a state that requires maintenance, as described with reference to FIGS. 9B and 9C, the process advances to step S1106 to send the information of a maintenance window (warning window) (to be described later with reference to FIGS. 12) to the MFP 101 as an HTTP response. Upon determining in step S1105 that there is no information representing the necessity of maintenance, the process advances to step S1107 to send the window information of a normal window, for example, the execution instruction window indicated by (c) in FIG. 6 to the MFP 101 as an HTTP response.

Figure 12:
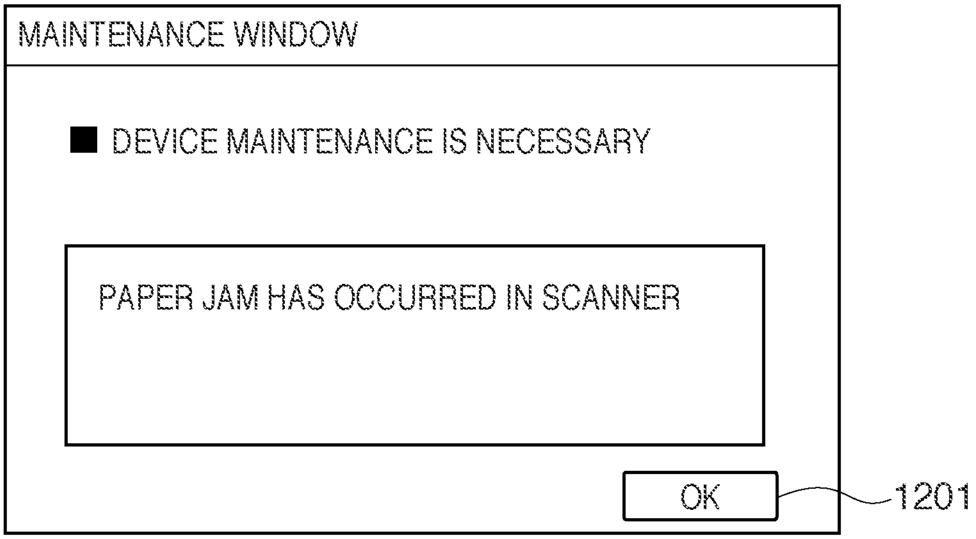
FIG. 12 is a view showing an example of a maintenance window.

FIG. 12 is a view showing an example of a maintenance window as described in step S1106 of FIG. 11. The window in FIG. 12 is displayed on the operation unit 219 of the MFP 101. This window is displayed based on the window information of the maintenance window sent from the Web server 103 as an HTTP response based on the MFP device information received from the MFP 101. For example, FIG. 12 shows a window when paper jam has occurred in the scanner 221. Upon detecting press of an OK button 1201, the Web browser 440 sends the information to the Web server 103, and the window transits to that indicated by (b) in FIG. 6 based on the acquired window information.

According to this embodiment, information in the MFP 101 is acquired at a window transition timing in the MFP 101, and the information is put in the next request. This allows the Web application 410 of the Web server 103 to provide an appropriate window to the MFP 101. As described above, the next request includes the information. It is therefore possible to minimize communication between the MFP 101 and the Web server 103 and reduce wasteful exchanges. Since the information in the MFP 101 is acquired based on the HTML (Java®Script) provided by the Web application 410 of the Web server 103, the Web server 103 can take the initiative in controlling window transition. That is, the window transition control can be changed without any change on the side of the MFP 101. In addition, when user logout has occurred in the MFP 101, the information is sent to the Web application 410 of the Web server 103 as well. As a result, the user login/logout state in the MFP 101 and that in the Web server 103 can appropriately synchronize.

[Second Embodiment]

The second embodiment of the present invention will be described next. In the second embodiment, a case will be explained in which a Web server 103 constructs a detailed window in accordance with the state of an MFP based on MFP device information sent from the MFP, and sends a response.

Figure 13:
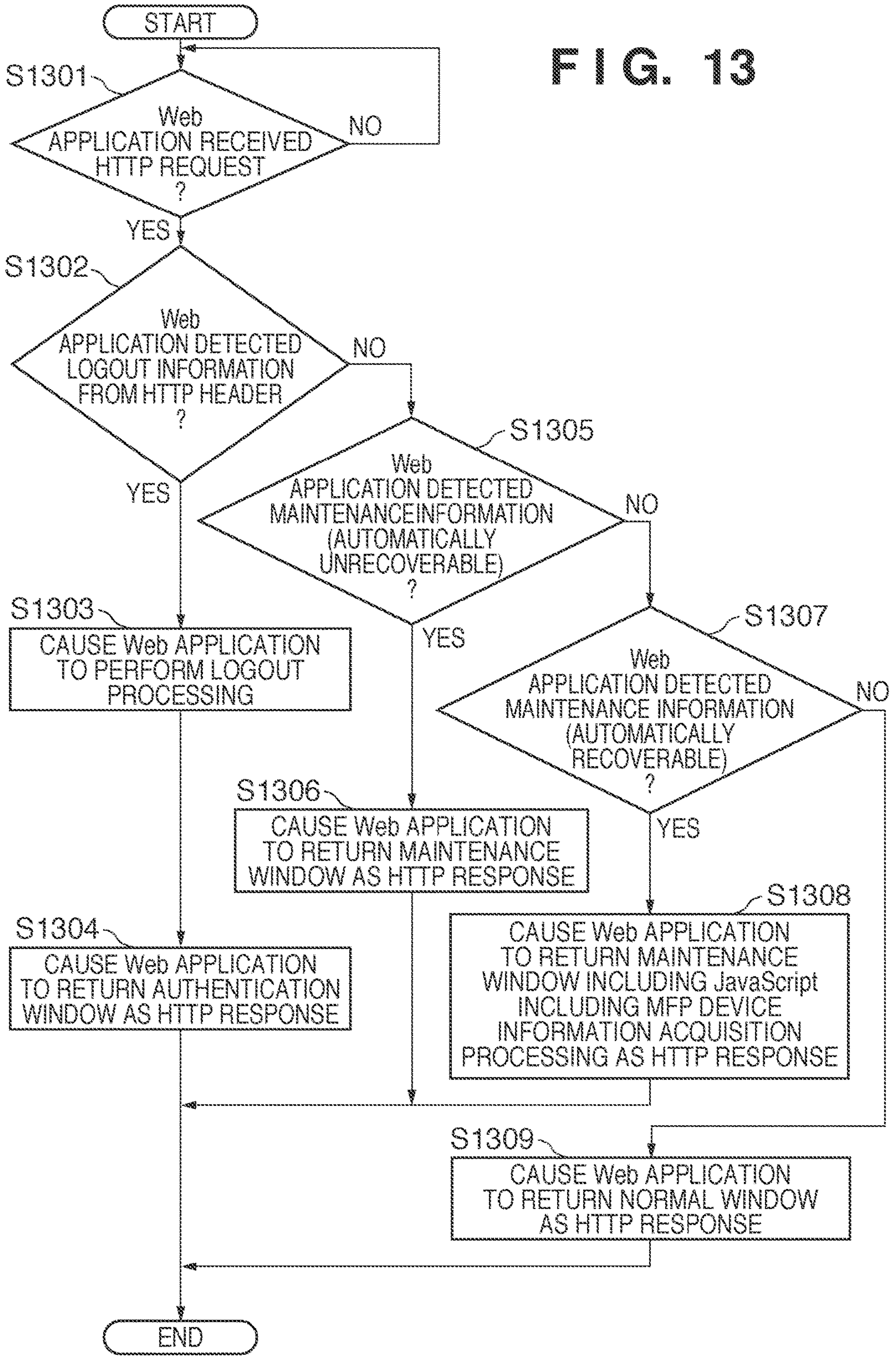
FIG. 13 is a flowchart illustrating another processing of causing the Web server to change the response window.

FIG. 13 is a flowchart illustrating the procedure of processing of causing the Web server 103 to receive an HTTP request from an MFP 101 and change the response window in accordance with information included in the HTTP request. The processes shown in FIG. 13 are implemented by causing a CPU 311 of the Web server 103 to execute control programs. In step S1301, a Web application 410 determines whether an HTTP request from the MFP 101 has been received. The process of step S1301 is repeated until reception is determined. Upon determining that an HTTP request has been received, the process advances to step S1302. The Web application 410 determines whether logout information has been detected from the HTTP request. Upon determining that the HTTP request includes logout information, the process advances to step S1303 to clear login/logout information held by an authentication processing unit 413 in the Web application 410. In step S1304, the information of the authentication window indicated by (a) in FIG. 6 is sent to the MFP 101 as an HTTP response.

Figure 14:
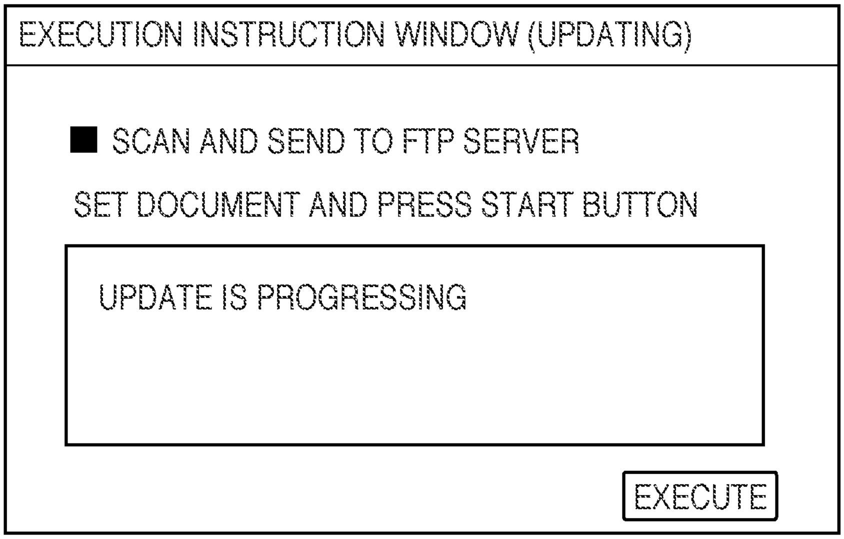
FIG. 14 is a view showing an example of an execution instruction window including an update progress message.

If the information included in the HTTP request header is not logout information in step S1302, the process advances to step S1305 to determine whether the MFP device information of the MFP 101 is information representing the necessity of maintenance and an automatically recoverable state. In an automatically unrecoverable maintenance state that needs human intervention, as described with reference to FIG. 9B, the process advances to step S1306 to send the information of a maintenance window shown in FIG. 12 to the MFP 101 as an HTTP response. If the apparatus is not in the automatically unrecoverable maintenance state in step S1305, the process advances to step S1307 to determine whether the apparatus is in the automatically recoverable maintenance state. The automatically recoverable state is assumed to be, for example, the excess job state shown in FIG. 9C. If it is determined that the apparatus is in the automatically recoverable maintenance state, window information as shown in FIG. 14 to be described later is sent to the MFP 101 as an HTTP response. If it is not determined in step S1307 that the apparatus is in the automatically recoverable maintenance state, the process advances to step S1309 to send the window information of a normal window, for example, the execution instruction window indicated by (c) in FIG. 6 to the MFP 101 as an HTTP response.

FIG. 14 is a view showing an example of an execution instruction window including an update progress message as described in step S1308 of FIG. 13. The window in FIG. 14 is displayed on an operation unit 219 of the MFP 101. This window is displayed based on the window information of the maintenance window for the automatically recoverable maintenance state sent from the Web server 103 as an HTTP response based on the MFP device information received from the MFP 101.

Figure 15:
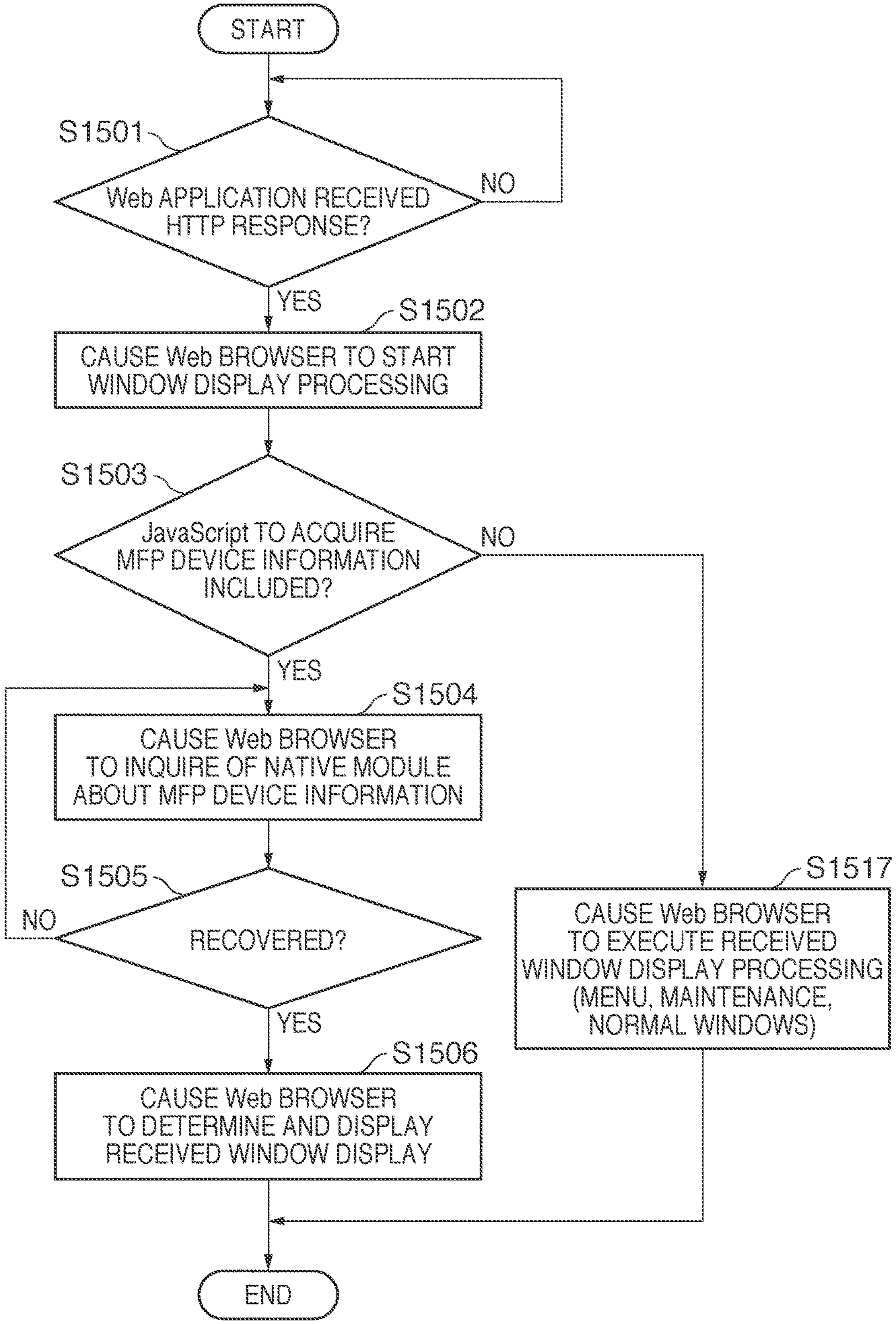
FIG. 15 is a flowchart illustrating processing when the MFP has received the window information shown in FIG. 13.

FIG. 15 is a flowchart illustrating the procedure of processing when the MFP 101 has received the window information described with reference to FIG. 13 from the Web server 103. The processes shown in the flowchart of FIG. 15 are implemented by causing a CPU 211 of the MFP 101 to execute control programs. In step S1501, a Web browser 440 of the MFP 101 determines whether an HTTP response has been received. The process of step S1501 is repeated until reception of an HTTP response is determined. In step S1502, the Web browser 440 starts processing window information. In step S1503, the Web browser 440 determines whether Java®Script is included in the window information. Upon determining that Java®Script is included, the Web browser 440 inquires of a native module 490 about MFP device information. This corresponds to a case in which the Web server 103 has sent the automatically recoverable maintenance window (FIG. 14) in step S1308 of FIG. 13. In step S1505, it is determined whether the apparatus has recovered. The process of step S1505 is repeated until recovery is determined. Upon determining in step S1505 that the apparatus has recovered, the Web browser 440 determines the window display, and displays the window indicated by (b) in FIG. 6 on the operation unit 219 in step S1506.

Referring back to step S1503, upon determining in step S1503 that Java®Script is not included, the menu window indicated by (b) in FIG. 6 or the maintenance window in FIG. 12 is displayed.

According to this embodiment, information in the MFP 101 is acquired at a window transition timing in the MFP 101, and the information is put in the next request. This allows the Web application 410 of the Web server 103 to provide an appropriate window to the MFP 101. Especially, constructing a detailed window on the side of the Web application 410 in accordance with the device state of the MFP 101 enables more appropriate and easy-to-understand window display for the user.

[Third Embodiment]

The third embodiment of the present invention will be described next. In the third embodiment, a case will be described in which logout information or MFP device information is acquired upon receiving window information, unlike the first embodiment.

Figure 16A:
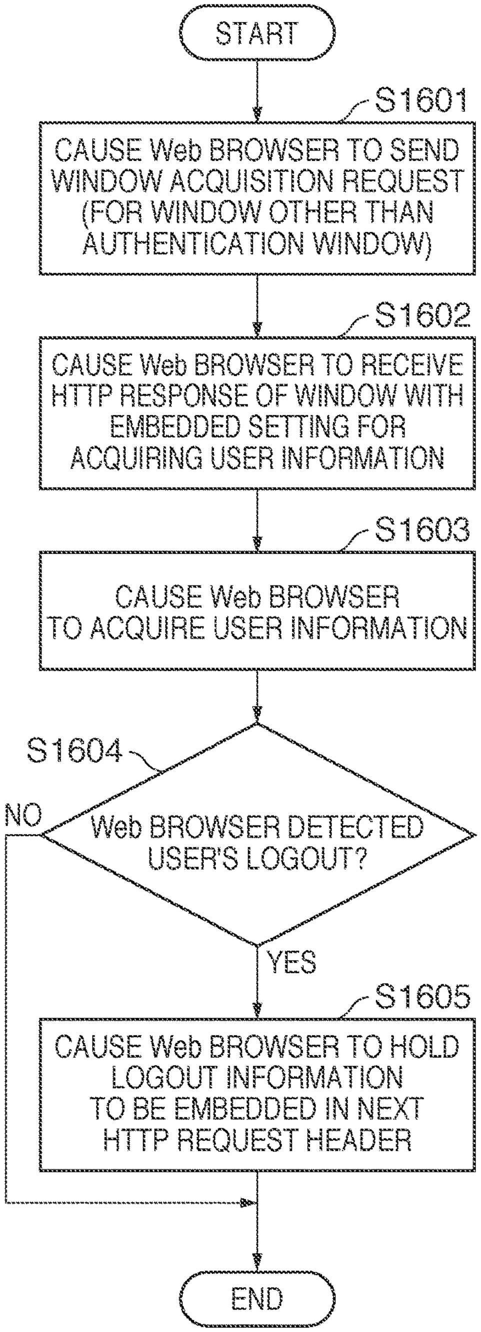
FIGS. 16A and 16B are flowcharts illustrating another processing of sending a request including MFP information.
Figure 16B:
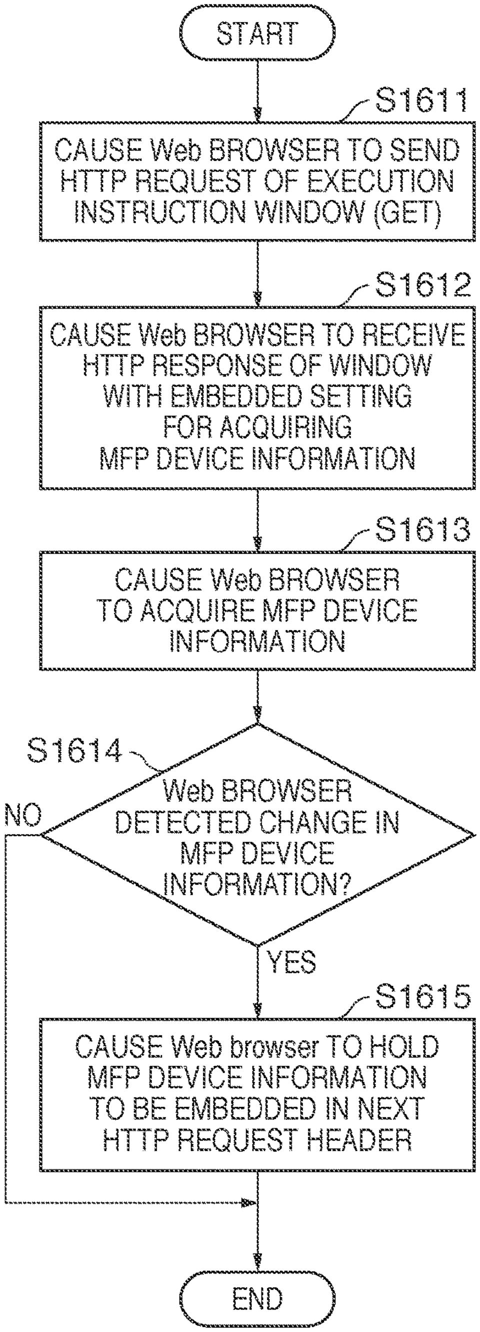

FIGS. 16A and 16B are flowcharts illustrating causing an MFP 101 to acquire logout information or MFP device information upon receiving window information. The operations shown in the flowcharts of FIGS. 16A and 16B are executed in the MFP 101 and implemented by causing a CPU 211 of the MFP 101 to execute control programs.

FIG. 16A shows a case in which the MFP 101 puts logout information in the next HTTP request. In step S1601, an arbitrary window acquisition request after user's login is sent to a Web server 103. In step S1602, an HTTP response (HTML data) including a setting for acquiring logout information, for example, Java®Script or metadata added to HTML is received from the Web server 103.

In step S1603, a Web browser 440 acquires logout information. In step S1604, it is determined that the Web browser 440 has detected logout information. Upon determining that logout information has been detected, the logout information is held in step S1605 to as to be embedded in the next HTTP request and sent to the Web server 103. If no logout information is detected in step S1604, the processing ends without any operation (the window remains unchanged).

FIG. 16B shows a case in which the MFP 101 puts MFP device information in the next HTTP request. In step S1611, an acquisition request of the execution instruction window indicated by (c) in FIG. 6 is sent to the Web server 103. In step S1612, an HTTP response (HTML data) including a setting for acquiring MFP device information, for example, Java®Script or metadata added to HTML is received from the Web server 103. In step S1613, the Web browser 440 acquires MFP device information. In step S1614, it is determined that the Web browser 440 has detected a change in the MFP device information. Upon determining that a change has been detected, the MFP device information is held in step S1615 to as to be embedded in the next HTTP request and sent to the Web server 103. If no change in the MFP device information is detected in step S1614, the processing ends without any operation (the window remains unchanged).

According to this embodiment, information in the MFP 101 is acquired at a timing the MFP 101 has received window information generated by the Web application 410 of the Web server 103, and window display is determined. If the MFP is not suitable for window display, the information is put in the next request to obtain appropriate window display. This enables appropriate window display even when a state acquisition setting is always embedded in window information on the side of the Web application 410 of the Web server 103, in addition to the first and second embodiments.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-218003, filed Sep. 18, 2009, which is hereby incorporated by reference herein in its entirety.

What is claimed is:

1. An information processing system comprising:

an information processing apparatus having a plurality of kinds of multifunction peripheral functions; and a server, wherein the server includes a processor coupled to a memory, the processor and the memory cooperating to function to:

provide, to the information processing apparatus, a first file for displaying a function selection screen including a plurality of buttons including buttons corresponding to the plurality of kinds of multifunction peripheral functions and a button for accepting a selection of a function, wherein the plurality of buttons are used when a user selects a function to be executed and the plurality of buttons do not cause the function to be executed, and wherein the first file includes a script for instructing the information processing apparatus to acquire and send, to the server, status information indicating a status of a device of the information processing apparatus used by the function corresponding to a button selected by the user from the plurality of buttons in accordance with the script, receive button information indicating a kind of the button selected by the user and the status information sent from the information processing apparatus, determine whether the received status information indicates an error, provide, to the information processing apparatus, a second file for displaying a setting screen based on the received button information, in a case where it is determined that the received status information does not indicate the error, wherein the setting screen includes a button for accepting a setting of the function and a button for executing the function, and provide, to the information processing apparatus, a third file for displaying an error screen for indicating the error in a case where it is determined that the received status information indicates the error, and the information processing apparatus includes a processor coupled to a memory, the processor and the memory cooperating to function to:

request the first file, receive the first file from the server, display the function selection screen including the plurality of buttons, wherein the plurality of buttons are used when the user selects the function to be executed and the plurality of buttons do not cause the function to be executed, based on the first file, receive a selection of the button from the plurality of buttons, acquire, in accordance with the script, the status information of the device of the information processing apparatus used by the function corresponding to the selected button, wherein the status information is acquired before an instruction is accepted by the button for executing the function via the setting screen, send the acquired status information to the server in accordance with a user operation accepted via the function selection screen, with the button information indicating a kind of the button selected by the user, display, in a case where the second file is provided by the server as a response to the sending based on the user operation, the setting screen based on the second file, wherein the setting screen is displayed before the instruction is accepted by the button for executing the function via the setting screen, and display, in a case where the third file is provided by the server as a response to the sending based on the user operation, the error screen based on the third file, wherein the error screen is displayed before the instruction is accepted by the button for executing the function via the setting screen.

2. A user interface display control method executed in an information processing system including a server and an information processing apparatus having a plurality of kinds of multifunction peripheral functions, the method comprising steps of:

in the server:

providing, to the information processing apparatus, a first file for displaying a function selection screen including a plurality of buttons including buttons corresponding to the plurality of kinds of multifunction peripheral functions and a button for accepting a selection of a function, wherein the plurality of buttons are used when a user selects a function to be executed and the plurality of buttons do not cause the function to be executed, and wherein the first file includes a script instructing the information processing apparatus to acquire and send, to the server, status information indicating a status of a device of the information processing apparatus used by the function corresponding to a button selected by the user from the plurality of buttons in accordance with the script, receiving button information indicating a kind of the button selected by the user and the status information sent from the information processing apparatus, determining whether the received status information indicates an error, providing, to the information processing apparatus, a second file for displaying a setting screen based on the received button information, in a case where it is determined in the determining step that the status information received in the receiving step does not indicate the error, wherein the setting screen includes a button for accepting a setting of the function and a button for executing the function, and providing, to the information processing apparatus, a third file for displaying an error screen for indicating the error in a case where it is determined in the determining step that the status information received in the receiving step indicates the error; and in the information processing apparatus:

requesting the first file, receiving the first file from the server, displaying the function selection screen including the plurality of buttons, wherein the plurality of buttons are used when the user selects the function to be executed and the plurality of buttons do not cause the function to be executed, based on the first file, receiving a selection of the button from the plurality of buttons, acquiring, in accordance with the script, the status information of the device of the information processing apparatus used by the function corresponding to the selected button, wherein the status information is acquired before an instruction is accepted by the button for executing the function via the setting screen, sending the acquired status information to the server in accordance with a user operation accepted via the function selection screen, with the button information indicating a kind of the button selected by the user, displaying, in a case where the second file is provided by the sever as a response to the sending based on the user operation, the setting screen based on the second file, wherein the setting screen is displayed before the instruction is accepted by the button for executing the function via the setting screen, and displaying, in a case where the third file is provided by the server as a response to the sending based on the user operation, the error screen based on the third file, wherein the error screen is displayed before the instruction is accepted by the button for executing the function via the setting screen.

3. The information processing system according to claim 1, wherein the determination of whether the received status information indicates the error includes a determination of whether the received status information indicates a first error which requires maintenance by a user or the received status information indicates a second error which does not require maintenance by a user, and the processor and the memory of the server further cooperate to function to change content of the third file based on a determination result of whether the received status information indicates the first error or the second error.

4. The information processing system according to claim 3, wherein, in a case where the received status information indicates the second error which does not require maintenance by the user, the third file includes another script for instructing the information processing apparatus to acquire and send, to the server, status information indicating a status of the device of the information processing apparatus used by the function.

5. The information processing system according to claim 1, wherein the plurality kinds of multifunction peripheral functions includes a scanning function and a printing function.

* * * * *